United States Patent Office 2,957,774
Patented Oct. 25, 1960

2,957,774
GYPSUM COMPOSITION

Rexford L. Selbe, Skokie, and Robert E. Jacobson, Chicago, Ill., assignors to United States Gypsum Company, Chicago, Ill., a corporation of Illinois No Drawing. Filed June 27, 1957, Ser. No. 668,322

13 Claims. (Cl. 106—109)

This invention relates to a new gypsum composition and more particularly relates to gypsum compositions having reduced water absorption rates and to materials incorporating such compositions.

Specifically the present invention is an improvement over the compositions disclosed in the copending application Serial No. 668,323, filed June 27, 1957, by Robert E. Jacobson, one of the inventors of the present gypsum composition.

Gypsum is utilized in the building field for a wide variety of materials. For example, gypsum board lath or plaster base is a well known article of commerce and one class thereof is embodied in perforated lath which is particularly useful as a plaster base. The manufacture of such perforated gypsum lath is described in United States Patent No. 1,938,354 to Roos.

Broadly, conventional perforated gypsum lath comprises a board having a central set gypsum core of a cementitious character and a plurality of paper sheets covering the core. A plurality of regularly spaced apertures are provided extending through the board to the opposed surfaces thereof. In such a construction the gypsum core is exposed at each aperture. In use perforated gypsum lath is mounted on studding to form a base for a plaster wall, and the plaster applied to the surface thereof by troweling or otherwise. The plaster so applied to said perforated board penetrates the apertures to lock the surface coat to the lath. Accordingly, it is apparent that the plaster coat contacts the gypsum core of said lath at the apertures in the board. Generally, the paper cover sheets utilized in the lath, contain a sizing material, while the core contains no such size. The ultimate result of the ordinary construction of this type is that a difference in absorption rates is present between the cover sheets and the gypsum core. This differential absorption is particularly manifest in the workability of the plaster when the plaster coat is leveled with a rod on the lath surface. The gypsum core, having a high rate of water absorption, soaks up the water present in the plaster adjacent to and contacting the core at the apertures in the perforated lath, and causes the plaster to stiffen over the apertures due to change in plasticity. This stiffening makes the plaster difficult to smooth and shortens the working life of the plaster before completion of the application. In come cases this difficulty persists even to the second application or coat of plaster. Similar difficulties may be encountered in other gypsum articles such as for example gypsum tile which is subsequently coated with plaster. Thus, it may be seen that the desirability of having the exposed core of the perforated lath absorb water at the same rate as the paper cover sheets has long been recognized.

Accordingly, it is one object of the present invention to provide a perforated gypsum board having a water absorption rate for the gypsum core substantially the same as that of the paper cover.

Another object is the provision of a gypsum composition having utility in manufacture of gypsum articles that has a reduced water absorption rate as compared to ordinary set gypsum.

Another object is the provision of a perforated gypsum lath which permits an extended working life for the plaster coat being applied thereto.

These and other objects of the present invention will become apparent from the following description and the appended claims.

Accordingly in one broad form the present invention comprises a gypsum composition having a reduced water absorption rate which comprises set gypsum crystals containing admixed therewith a Diels-Alder adduct of maleic-anhydride and a natural resin acid, a lignin salt dispersing agent and an acidic precipitant.

The set gypsum crystals are, of course, provided by the addition of water to calcium sulfate hemihydrate to produce the hydrated material. The Diels-Alder adduct described as one additive of the present composition is provided by the reaction in a Diels-Alder manner between maleic anhydride and a natural resin acid which may be further characterized as one containing a 1,3-dienically unsaturated acid or one convertible thereto by isomerization. The resin acids are generally found in resins such as wood rosin, gum rosin and so-called tall oil rosin. In the commercial rosin products, these acids are generally considered to be mixtures in various proportions of abietic, levopimaric, palustric, neoabietic, dihydroabietic, dextropimaric and perhaps other acids. As is well known, maleic anhydride reacts as the dienophile in such adductions. It should be stated that maleic acid is the equivalent of maleic anhydride in preparing these adducts. Generally in the present compositions it is preferred to incorporate the adducts of maleic anhydride and the natural resin acid in the form of an emulsion wherein the adduct has been converted at least partially to a water-soluble alkali metal soap. These emulsions can be most conveniently prepared by emulsification of the acid adduct with a soap forming alkaline material such as sodium or potassium hydroxide. The reaction is relatively straight-forward and comprises reacting in an aqueous medium the adduct and an alkaline material.

Generally for good results the acid adduct need not be completely converted to soap, but it is preferred that some of such adduct should be in water soluble soap form, particularly since the adduct in this form is more readily incorporated into the gypsum composition as an emulsion added to the gauging water which is subsequently added to the stucco. In the preparation of the maleic anhydride-resin acid adducts it should be stated that the two reactants should be present in the reaction mixture from equimolar quantities to as low as 2 parts of maleic anhydride to 100 parts of rosin. This latter provides an adduct which has an acid number of about 165 which is the minimum.

The lignin salt dispersing agent described above is preferably a water soluble salt of a lignin sulfonate. Salts of lignin sulfonates contemplated as useful in the present invention are water-soluble alkali or alkali metal salts or more specifically those salts selected from the group of calcium, ammonium and the alkali metals. The alkali metals of course are construed to include sodium, potassium, lithium, caesium and ammonium which latter in its characteristics most closely resembles an alkali metal. As a non-fully equivalent alternative there may also be used in conjunction with or in place of the aforementioned water-soluble salts of lignin sulfonate other water-soluble salts of lignin such as "alkali lignin" which is a known lignin dispersant, derived from the kraft paper-making process. Generally these dispersants are incorporated into the gypsum plaster by dissolving the same in the water utilized for mixing with the said gypsum plaster. The proportions are relatively small with reference to the plaster and may be present in the range of from about 0.1 to about 1.0 percent by weight.

The acidic precipitant is preferably an acidic or acid reacting salt such as for example alum (aluminum sulfate), zinc sulfate, aluminum chloride, ferric chloride, or the like. Such acid reacting salts are well known in the art as precipitants.

Broadly, the gypsum compositions of the present invention contain from about 0.075 to about 0.75, preferably 0.1 to 0.5, percent by weight of the aforesaid adduct of maleic anhydride and the unsaturated resin acid, preferably in soap form, from about 0.1 to about 1.0 percent by weight of a water-soluble salt of a lignin sulfonate and from about 0.1 to about 0.5 percent by weight of the acid precipitant. The percentages are based on the predominantly crystalline, hydrated, set gypsum composition in its final dried form.

The novel gypsum compositions of the present invention are prepared in a conventional manner well known in the art. Broadly the procedure involves placing the raw materials, calcined gypsum (stucco), water, foam and accelerators and other conventional additives, into a mixer followed by agitation to thoroughly blend the materials. After mixing in the conventional mixers, the plaster material is removed from the mixer and formed into sheets, perforated lath, gypsum tile, or other finished products. After these products have been formed and set they are dried and are ready for shipment and use.

The following examples will illustrate the preparation of the adducts and the gypsum compositions of the present invention wherein parts are expressed in parts by weight:

EXAMPLE 1

*Adduct of maleic anhydride and FF wood rosin*

To 800 parts of FF wood rosin (acid number 157) contained in a reaction vessel, were added 260 parts of maleic anhydride. The reaction mixture was heated at about 235° C. for a period of 1 hour. During that period, carbon dioxide was passed over the surface of the liquid reactants. At the end of this period the unreacted maleic anhydride was removed by steam distillation at elevated temperatures (200° C.). The residual adduct had an acid number of 257. The reaction product of maleic anhydride and wood rosin (80 parts) was blended with 20 parts of the FF wood rosin to produce a blend having an acid number of 229. The blend was then formed into a soap or emulsion by grinding 200 parts of the adduct blend to pass a 40 mesh screen. The powdered blend was suspended in a solution of 48.2 parts of commercial sodium carbonate monohydrate in 90 parts of water. The slurry so formed was heated to boiling with agitation to produce a concentrated emulsion, which can be diluted to any desired concentration, but it should be noted that the initial dilution should preferably be effected using hot water.

EXAMPLE 2

*Production of perforated lath*

To 1600 parts of stucco (calcined gypsum) were added 6 parts of alum, 73 parts of a 4% emulsion of maleic anhydride resin acid adduct, prepared as in Example 1, 39 parts of a 15% solution of ammonium lignosulfonate in 1440 parts of water. The calcined gypsum, water, and other materials together with conventional additives such as bond reinforcers (degraded starch 8.6 parts) and set control agents ($CaSO_4 \cdot 2H_2O$, 4.6 parts), were blended in a mixer. The resulting plaster was removed from the mixer and placed between sized cover sheets to form a lath having a thickness of about ⅜ inch. Circular perforations about ¾ inch in diameter were made in the wet set sheet which was then dried.

The perforations of the dried perforated gypsum lath were utilized to determine the relative water absorption characteristics of the gypsum core. In this test the bottom of a cylindrical perforation was sealed to form a cavity ⅜″ deep and ¾″ in diameter. Five (5) milliliters of water at 70° F. were placed in the cavity so formed. The time required for the complete absorption of the 5 milliliters of water is referred to as the "5 milliliter absorption rate."

In the case of the lath described in Example 2, the 5 milliliter absorption rate was found to be 3118 seconds as contrasted to a lath prepared in this same fashion, but without addition of the resin acid adduct, ammonium lignosulfonate, and the alum, which had a 5 milliliter absorption time of 120 seconds.

EXAMPLE 3

*Production of perforated lath*

The procedure of Example 2 was followed except that the maleic adduct blend used consisted of 60 parts of the reaction product listed in Example 1 and 40 parts of FF wood rosin (acid number of blend 222) used in the amount of 73 parts of 4% solids emulsion, together with the recited amounts of other materials. Gypsum lath so prepared had a 5 milliliter absorption rate of 4720 seconds.

EXAMPLE 4

*Production of perforated lath*

The procedure of Example 2 was followed except that the maleic anhydride-resin acid adduct blend illustrated in Example 1 comprised 40 parts of the adduct and 60 parts of the FF wood rosin (acid number of blend 196). The lath had a 5 milliliter absorption rate of 2969 seconds.

EXAMPLE 5

*Production of perforated lath*

A perforated lath was prepared in accordance with Example 2, utilizing 20 parts of adduct and 80 parts FF wood rosin (acid number of blend 178). The lath had a 5 milliliter absorption rate of 3276 seconds.

EXAMPLE 6

*Production of perforated lath*

A perforated lath was prepared in accordance with Example 2 utilizing however an adduct of maleic anhydride and gum rosin incorporated therein prepared as in Example 1. The lath had a 5 milliliter absorption rate of 2337 seconds.

EXAMPLE 7

*Production of perforated lath*

A perforated lath was prepared in accordance with Example 2, utilizing an adduct of maleic anhydride and B wood rosin prepared as in Example 1. The lath so produced had a 5 milliliter absorption rate of 803 seconds.

EXAMPLE 8

*Production of perforated lath*

This example will illustrate the effect of ammonium lignosulfonate as a synergistic agent. Two perforated laths were prepared in the fashion described in Example 2, using 1600 parts of stucco (calcined gypsum), 2.9 parts of the adduct (acid No. 257) described in Example 1, and 6 parts of alum as well as the conventional agents therein recited. In the gypsum lath composition of one of these samples were added 5.8 parts of lignosulfonate dispersant. This perforated lath had a 5 milliliter absorption rate of 2508 while the companion product containing no lignosulfonate, but in all other respects identical, had a 5 milliliter absorption rate of 887 seconds.

EXAMPLE 9

*Production of perforated lath*

Maleic anhydride was adducted with unsaturated resin acids as are found in gum rosin or FF wood rosin in the following manner and in the proportions indicated:

(1) 100 parts gum rosin: 2 parts maleic anhydride
(2) 100 parts gum rosin: 5 parts maleic anhydride
(3) 100 parts FF wood rosin: 2 parts maleic anhydride
(4) 100 parts FF wood rosin: 5 parts maleic anhydride The adducts were formed from the above reactants in the ratios indicated by heating the rosin and maleic anhydride under a $CO_2$ blanket for one-half hour at 150° C., and for an additional one-half hour at 200°–250° C. The adducts were then converted to the corresponding soap using sodium carbonate as described in Example 1. The four adducts described above were incorporated into gypsum lath compositions as described in Example 8, preparing duplicate lath samples with each adduct soap but utilizing the ammonium lignosulfonate additive in only one of the samples. The effect of the lignosulfonate is seen in the following table:

| Adduct | Acid No. of Adduct | 5 cc. Absorption Rate (Seconds) Average of 3 Tests | |
|---|---|---|---|
| | | With Ammonium Lignosulfonate | Without |
| #1 | 171.6 | 2,538 | 837 |
| #2 | 186.7 | 2,660 | 928 |
| #3 | 166.4 | 2,298 | 723 |
| #4 | 192 | 3,395 | 1,007 |
| No additives | | 145 | |

While the specific examples have illustrated certain well known rosin materials as a source of the 1,3-dienically unsaturated natural resin acid, it is also true that many other rosin or natural gum materials may also be utilized as a reactant with maleic anhydride in a Diels-Alder manner as described hereinbefore, and subsequently saponified to produce a soap which is useful in reducing the water absorption tendencies of the set gypsum core of perforated gypsum lath, as taught by the present invention.

With respect to conventional additives such as set control agents or bond reinforcers utilized above, it should be mentioned that such use is not necessary as part of the present invention, and that the gypsum compositions herein described are fully operative in the absence of such additives.

Although the above examples have been illustrative of the utility of the present gypsum compositions in the production of perforated gypsum lath, it is also true that this characteristic of reduced water absorption is equally valuable for use in other materials formed from gypsum which are subsequently coated with plaster. As has been previously stated, the incorporation of the adducts hereinbefore described has been extremely valuable in reducing the "hot holing" of perforated lath, particularly when such adducts are used in combination with lignosulfonate dispersing agents and acidic precipitants. Thus plaster may be applied to perforated lath made from such compositions without rapid and concomitant stiffening of the plaster thereby permitting an increased working time for said plaster applied to the lath.

It will be understood that calcium ions or cations of the precipitants or their equivalents may react with the adduct and accordingly it is not known whether the adduct in the product of this invention exists as the free acid or as a soap or both. Such soaps, if present, are intended to be encompassed within the term "adduct" as used in this specification and in the accompanying claims.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A gypsum composition consisting essentially of set gypsum crystals containing minor amounts of a lignosulfonate dispersant, an acidic salt precipitant, and the reaction product of maleic anhydride and rosin wherein the maleic anhydride is initially present in an amount of at least two parts per 100 parts of rosin and wherein said reaction product has an acid number of greater than 165.

2. A perforated gypsum lath having a reduced water absorption rate which comprises paper cover sheets encasing a core consisting essentially of set gypsum crystals in admixture with minor amounts of a soap of a Diels-Alder adduct having an acid number greater than about 165 of maleic anhydride and a 1,3-dienically unsaturated natural resin acid selected from the group consisting of wood rosin, gum rosin, and tall oil rosin; a lignosulfonate dispersant and an acidic salt precipitant.

3. A perforated gypsum lath having a reduced water absorption rate which comprises paper cover sheets encasing a core consisting essentially of set gypsum crystals in admixture with from 0.075 to 0.75% by weight of a Diels-Alder adduct having an acid number greater than about 165 of maleic anhydride and a 1,3-dienically unsaturated natural resin acid, from about 0.1 to 1.0% by weight of a lignosulfonate dispersant and from about 0.1 to 0.5% by weight of an acidic salt precipitant.

4. The perforated gypsum lath of claim 14 wherein the 1,3-dienically unsaturated natural resin acid is that occurring in a resin selected from the group consisting of wood rosin, gum rosin and tall oil rosin.

5. A perforated gypsum lath having a reduced water absorption rate which comprises paper cover sheets encasing a core consisting essentially of set gypsum crystals in admixture with from 0.1 to 0.5% by weight of a Diels-Alder adduct having an acid number greater than about 165 of maleic anhydride and a natural resin acid occurring in a resin selected from the group consisting of wood rosin, gum rosin and tall oil rosin; and from 0.1 to 1.0% by weight of a lignosulfonate dispersant, and from 0.1 to 0.5% by weight of an acidic salt precipitant.

6. A gypsum composition consisting essentially of set gypsum crystals containing therein minor amounts of a Diels-Alder adduct having an acid number greater than about 165 of maleic anhydride and a 1,3-dienically unsaturated natural resin acid, a lignin salt dispersant and an acidic salt precipitant.

7. A gypsum composition consisting essentially of set gypsum crystals containing therein minor amounts of a soap of a Diels-Alder adduct having an acid number greater than about 165 of maleic anhydride and a 1,3-dienically unsaturated natural resin acid, a lignin sulfonate dispersant and an acidic salt precipitant.

8. A gypsum composition consisting essentially of an admixture of set gypsum crystals containing minor amounts of a lignin sulfonate dispersant, an acidic salt precipitant, and a Diels-Alder adduct having an acid number greater than about 165 of maleic anhydride and a natural resin acid contained in resins selected from the group consisting of wood rosin, gum rosin and tall oil rosin.

9. A gypsum composition consisting essentially of set gypsum crystals containing admixed therewith from 0.075 to 0.75 percent by weight of a Diels-Alder adduct having an acid number greater than about 165 of maleic anhydride and a 1,3-dienically unsaturated natural resin acid, from 0.1 to 1 percent by weight of a water soluble salt of a lignosulfonate dispersant, and an acidic salt precipitant.

10. A gypsum composition consisting essentially of set gypsum crystals containing admixed therewith from 0.075 to 0.75 percent by weight of a Diels-Alder adduct having an acid number greater than about 165 of maleic anhydride and a 1,3-dienically unsaturated natural resin acid, from 0.1 to 1.0 percent by weight of a lignosulfonate dispersant, and from 0.1 to 0.5 percent by weight of an acidic salt precipitant.

11. A gypsum composition consisting essentially of set gypsum crystals containing admixed therewith from 0.075 to 0.75 percent by weight of a Diels-Alder adduct having an acid number greater than about 165 of maleic anhydride and a natural resin acid occurring in a resin selected from the group consisting of wood rosin, gum rosin and tall oil rosin, and from 0.1 to 1.0 percent by weight of a lignosulfonate dispersant, and from 0.1 to 0.5 percent by weight of an acidic salt precipitant.

12. A gypsum composition consisting essentially of set gypsum crystals containing admixed therewith from 0.1 to 0.5 percent by weight of a Diels-Alder adduct having an acid number greater than about 165 of maleic anhydride and a 1,3-dienically unsaturated natural resin acid, from about 0.1 to 1.0 percent by weight of a lignosulfonate dispersant, and from about 0.1 to 0.5 percent by weight of an acidic salt precipitant.

13. A perforated gypsum lath having a reduced water absorption rate which comprises paper cover sheets encasing a core consisting essentially of set gypsum crystals in admixture with minor amounts of a Diels-Alder adduct having an acid number greater than about 165 of maleic anhydride and a 1,3-dienically unsaturated natural resin acid, a lignosulfonate dispersant, and an acidic salt precipitant.

References Cited in the file of this patent

UNITED STATES PATENTS

| | | |
|---|---|---|
| 2,141,570 | Mark | Dec. 27, 1938 |
| 2,585,222 | Bruins et al. | Feb. 12, 1952 |
| 2,610,130 | Riddell et al. | Sept. 9, 1952 |
| 2,776,277 | Keim | Jan. 1, 1957 |
| 2,804,439 | Drechsel | Aug. 27, 1957 |

OTHER REFERENCES

Von Fisher: Paint and Varnish Technology, Reinhold Publishing Corp., New York, 1948, pp. 108–111.

UNITED STATES PATENT OFFICE
CERTIFICATION OF CORRECTION

Patent No. 2,957,774            October 25, 1960

Rexford L. Selbe et al.

It is hereby certified that error appears in the above numbered patent requiring correction and that the said Letters Patent should read as corrected below.

Column 6, line 30, for the claim reference numeral "14" read -- 3 --.

Signed and sealed this 25th day of April 1961.

(SEAL)
Attest:

ERNEST W. SWIDER
Attesting Officer

DAVID L. LADD
Commissioner of Patents